(12) United States Patent
Smith et al.

(10) Patent No.: US 6,838,034 B2
(45) Date of Patent: Jan. 4, 2005

(54) MULTI-PART SEQUENTIAL VALVE GATING (75) Inventors: Michael B. Smith, Smithton, IL (US); Keith Korte, Damiansville, IL (US); Todd C. Parker, Nashville, IL (US); Russell R. York, Hoyelton, IL (US)

(73) Assignee: Conix Corporation, Dearborn, MI (US)

( * ) Notice: Subject to any disclaimer, the term of this patent is extended or adjusted under 35 U.S.C. 154(b) by 0 days.

(21) Appl. No.: 10/250,884

(22) PCT Filed: Jan. 29, 2002

(86) PCT No.: PCT/US02/02456

§ 371 (c)(1), (2), (4) Date: Jul. 10, 2003

(87) PCT Pub. No.: WO02/062553

PCT Pub. Date: Aug. 15, 2002

(65) Prior Publication Data

US 2004/0051209 A1 Mar. 18, 2004

Related U.S. Application Data (60) Provisional application No. 60/264,916, filed on Jan. 29, 2001.

(51) Int. Cl.[7] .......................... B29C 45/13; B29C 45/22
(52) U.S. Cl. ............................... 264/297.2; 264/328.8; 425/130; 425/145; 425/572; 425/573
(58) Field of Search .............................. 264/40.5, 297.2, 264/328.8; 425/130, 145, 572, 573, 588

(56) References Cited

U.S. PATENT DOCUMENTS

| | | | |
|---|---|---|---|
| 4,034,952 A | | 7/1977 | Stewart |
| 4,125,352 A | | 11/1978 | Gellert |
| 4,279,582 A | * | 7/1981 | Osuna-Diaz ............... 425/159 |
| 4,338,068 A | | 7/1982 | Suh et al. |

(List continued on next page.)

FOREIGN PATENT DOCUMENTS

| | | | |
|---|---|---|---|
| DE | 19811466 | * | 9/1999 |
| JP | 2001-205656 | * | 7/2001 |

OTHER PUBLICATIONS

Kazmer et al., "Multi–Cavity Pressure Control in the Filling and Packing Stages of the Injection Molding Process", Polymer Engineering and Science, Nov. 1997, vol. 37, No. 11, pp. 1865–1879.*

D. Zheng & A. Alleyne—"Learning Control of an Electro–hydraulic Injection Molding Machine with Smoothed Fill–to–Pack Transition", Proceedings of the American Control Conference–Chicago, IL, Jun. 2000—pp. 2558–2562.

S.N. Huang, K.K. Tan, & T.H. LEE; "Adaptive GPC control of melt temperature in injection moulding"—ISA Transactions 38 (1999) pp. 361–373.

(List continued on next page.)

Primary Examiner—Jill L. Heitbrink
(74) Attorney, Agent, or Firm—Polster, Lieder, Woodruff & Lucchesi (57) ABSTRACT The present invention (FIGS. 1, 1, 2, 3, 4, 5, 6, 7, 8 9 10, 11, 12, 13, 14, 15, 16, 17, 18) provides an injection molding method and apparatus. A hot manifold is provided having a plurality of independently controlled valve gates. A controller is operably connected to each of the valve gates enabling independent opening and closing thereof. A mold has at least two cavities, a larger cavity and a relatively smaller cavity. The larger cavity has at least two inlets each communicating with the valve gates of the hot manifold. The smaller cavity has at least one inlet communicating with respective valve gate of the hot manifold. The larger cavity is filled with a first plasticized material by sequentially opening and closing the valve gates communicating with the large cavity. The larger cavity is packed out. Simultaneously with the packing out step, the smaller cavity is filled and packed out with a second plasticized material by opening and closing the at least one respective valve gate. A large and a small part may be molded in the same time as required for molding solely the large part.

23 Claims, 4 Drawing Sheets

U.S. PATENT DOCUMENTS

| | | | |
|---|---|---|---|
| 4,500,279 A | | 2/1985 | Devellian et al. |
| 5,078,589 A | | 1/1992 | Osuna-Diaz |
| 5,275,778 A | | 1/1994 | Von Holdt, Sr. |
| 5,653,934 A | | 8/1997 | Brun, Jr. et al. |
| 5,762,855 A | * | 6/1998 | Betters et al. ........... 264/328.8 |
| 5,773,038 A | | 6/1998 | Hettinga |
| 5,776,514 A | | 7/1998 | Wu et al. |
| 5,919,492 A | * | 7/1999 | Tarr et al. ................... 425/144 |
| 6,558,605 B1 | * | 5/2003 | Wilson ................... 264/328.8 |

OTHER PUBLICATIONS

Chris M. Seaman, Alan A. Desrochers, & George F. List; "Multiobjective Optimization of a Plastic Injection Molding Process"—IEEE Transactions on Control Systems Technolocy, vol. 2, No. 3—Sep. 1994; pp. 155–168.

G.A. Vagelatos, G.G. Rigatos, & S.G. Tzafestas; "Incremental fuzzy supervisory controller design for optimizing the injection molding process"—Expert Systems with Applications 20 (2001) pp. 207–216.

* cited by examiner

MULTI-PART SEQUENTIAL VALVE GATING

PRIORITY CLAIM

Priority is claimed to U.S. Provisional Application Ser. No. 60/264,916 filed on Jan. 29, 2001, entitled 'Multi-Part Sequential Valve Gating'.

FIELD OF THE INVENTION

The present invention relates generally to an injection molding system and method, and more particularly to an injection molding system and method that fills each molding cavity sequentially using multiple gates.

BACKGROUND OF THE INVENTION

Sequential injection molding techniques have been utilized for a number of years. U.S. Pat. No. 5,762,855 describes a method for molding large components in a mold having one mold cavity. Plasticized material is introduced into a single cavity mold through a manifold. The manifold has at least two spaced valve gates that are independently opened and closed as directed by a controller to selectively communicate plasticized material from the manifold to the mold cavity at separate locations in the mold cavity. The controller directs the valve gates to sequentially open and close during the filling phase so as to achieve the desired melt front advancement within the mold cavity. Once the mold cavity has been filled, the valve gates are closed to effectively seal the manifold from the mold cavity. The closed valve gates thereby assist in allowing the plasticized material within the manifold to be held in compression while the mold cavity is open for removal of the molded component from the mold cavity, so as to prevent appreciable expansion of the material that has been found to result in imperfections, such as splay, in molded products.

However, flash, the portion of melted material escaping between the two mold halves that form the mold cavity, continues to be a problem. Sometimes the problem is so severe that the molded component must be discarded. To correct the flash error would be prohibitively expensive with respect to the manual labor needed to remove the flash from each molded component. Also, sometimes the molds are underfilled, resulting in molded components that must be discarded. Many times the molding material may not even be recoverable from the incorrectly molded component. In addition, successively molding individual components is time-consuming. Thus, to be cost-effective, the molding process needs to be more closely controlled to avoid overfilling and underfilling of the mold. Additionally, increasing the number of molded products produced in a single cycle would also improve efficiency.

SUMMARY OF THE INVENTION

The present invention provides an injection method that utilizes the reduced pressure portions of a molding cycle to mold a second smaller part without increasing cycle times thereby increasing yield of the mold and improving efficiency of production.

The present invention provides an injection molding method and apparatus therefor. A hot manifold is provided having a plurality of independently controlled valve gates. A controller is operably connected to each of the valve gates enabling independent opening and closing thereof. A mold has at least two cavities, a larger cavity and a relatively smaller cavity. The larger cavity has at least two inlets each communicating with the valve gates of the hot manifold. The smaller cavity has at least one inlet communicating with respective valve gate of the hot manifold. The larger cavity is filled with a first plasticized material by sequentially opening and closing the valve gates communicating with the larger cavity. The larger cavity is packed out. Simultaneously with the packing out step, the smaller cavity is filled and packed out with a second plasticized material by opening and closing the at least one respective valve gate. A large and a small part may be molded in the same time as required for molding solely the large part.

The multi-cavity sequential valve gating system and method may be implemented to mold non-identical components or pairs of identical and non-identical components. The system and method may be implemented using dual injection with at one or more different plasticized materials, or co-injection in coordination with dual injection. Where desired, variable feed control may be used to input the selected plasticized materials.

The components that can be made in accordance with the present invention include the group consisting of automotive fascia, cladding, valence panel, rocker panel, air dam, grill, side trim strips, wheel lip molding, pillar, and interior components.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

The present invention implements sequential valve gating to mold a plurality of components substantially simultaneously. For example, an automobile fascia and trim components and the like may be produced together using the method of the invention. The invention may be implemented using an injection molding system, such as a 3500 ton Klockner Windsor press with sequential valve gate control that is modified to provide dual injection and/or co-injection as described below.

The present invention implements a co-coordinated multi-cavity mold system for utilizing a same single injection stroke of an injection molding machine to provide injection molding of a plurality of different component designs, weights and sizes in one molding tool. The plasticized material is conveyed through the hot sequential valve gated manifold, through multiple valve-pin drops to the respective molding cavities to provide melt fronts that are controlled independently of one another using a mechanical shut-off pin on the valve drop apparatus and opening and closing the valve drop during the injection phase. The drops are regulated by valve-pins that are located within the drops and that reciprocate parallel to the length of the drop. Raising the valve-pin opens the lower end of the drop, allowing plasticized material to pass through the drop. Lowering the valve-pin closes the opening at the lower end of the drop, stopping the flow of plasticized material.

The molds themselves, as is known in the art, typically consist of a cavity portion and a core portion that mate to form a mold cavity and are held together with mold press forces while the plasticized material is injected into the mold cavity and for a predetermined time thereafter to allow the molded component to solidify. After the predetermined time elapses, the mold is opened, and the molded component is removed. According to the present invention, the molds have at least two cavities, one larger than the other. The larger cavity has at least two inlets and the smaller has at least one inlet, each communicating with a respective valve gate on the manifold enabling sequential filling of each of the cavities, independently from each other.

The opening and closing of the drops may be controlled responsively to the position of the reciprocating screw, which in turn is controlled by a hydraulic motor, that advances the plasticized material along a channel of the main bore of the injection molding machine. The main bore opens into a runner of a manifold that distributes the plasticized material into the multiple valve-pin drops. Alternatively, the opening and closing of the drops may be controlled by a predetermined timing schedule. Generally, the predetermined timing schedule or position settings for the reciprocating screw is preprogrammed into a microprocessor located in the computerized control system of the injection molding machine.

Typically, the operator of the injection molding machine may modify the predetermined timing schedule as needed by inputting the changes into the computerized control system.

When the predetermined fill stage has been completed, the drops are controlled independently for the pack out phase of the injection molding process. During the pack out phase, all of the valve gates communicating with the cavity are opened, the injection pressure is reduced allowing plasticized material to continue to fill the cavity as the plasticized material within the cavity "freezes" and shrinks as it cools. Once the cavity has been completely filled, the valve gates are closed. Thereafter the mold is opened and the part removed.

During the pack out phase, the internal pressures on the mold press are not at a peak. The injection pressure of the plasticized melt is reduced. Thus, the present invention takes advantage of the reduced pressure and holding time to mold a second part. The second part is selected to be relatively smaller than the principal larger part of the mold. The size factors of the smaller part depend on the fill time of the smaller cavity and the amount of available tonnage of the press. For example, a pair of rocker panels (the larger part) could be molded in the same mold as a pair of trim strips (the smaller part). A further example includes a rear fascia being molded with a pair of support brackets for the fascia.

The gates and drops are balanced so that the molded parts are not over packed. The timing schedule for the microprocessor typically includes the preset times for opening, closing and holding times for each of the valve gates, permitting the valve gates to be operated independently of one another. The times are generally implemented in accordance with the screw position or the timing schedule. Solenoids coupled to the microprocessor may be utilized to control the output to the hydraulic or pneumatic or electric drive units that operate the valve gates.

Figure 1:
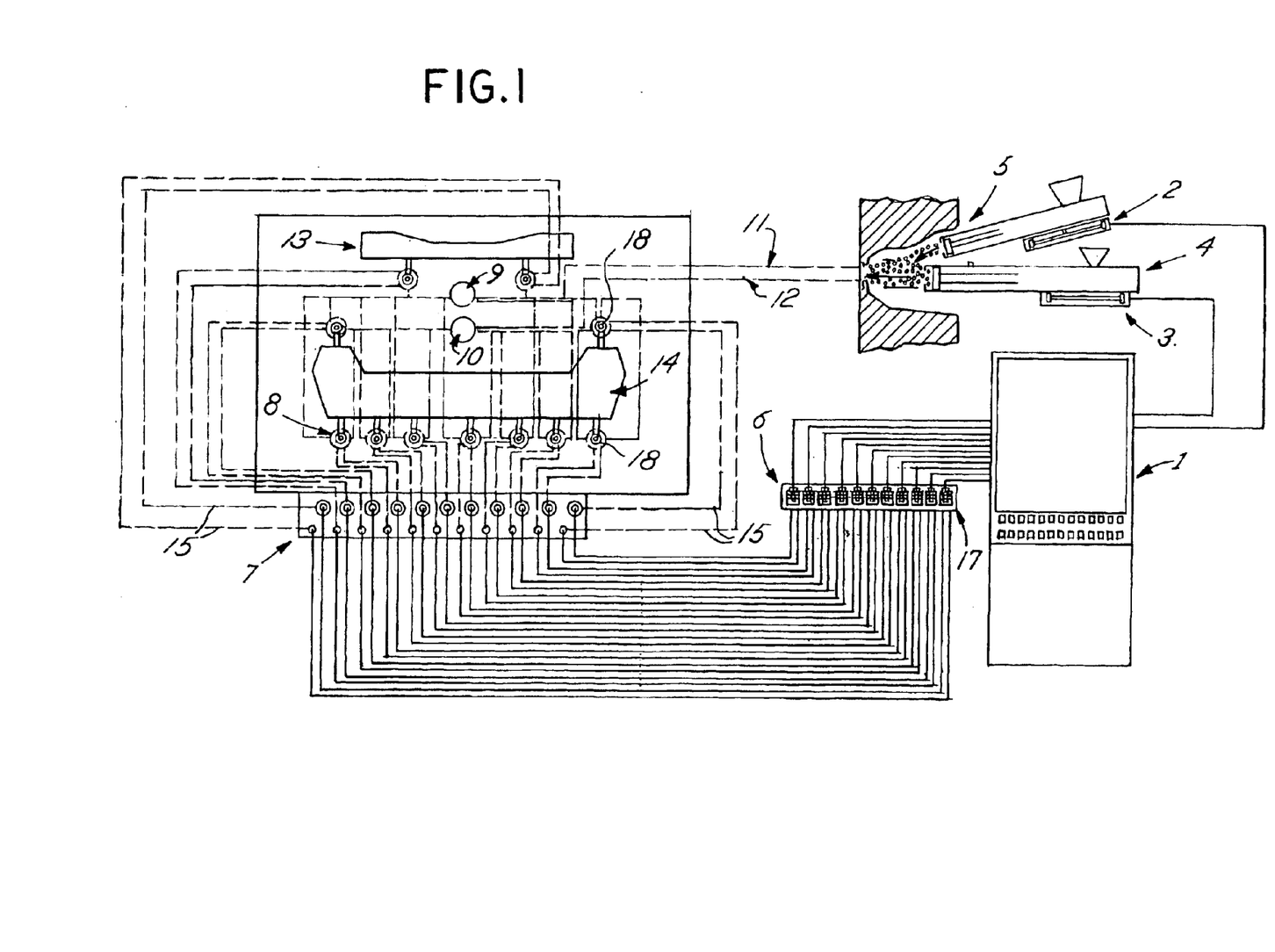
FIG. 1 illustrates one embodiment of a multi-cavity sequential valve gating system in accordance with the present invention.

As shown in FIG. 1, the present invention enables the molder to control the melt fronts one or more different polymer materials sequentially and independently from one another using a hot runner manifold system. FIG. 1 shows each gate having two drops, each for one of the plasticized materials, which are activated sequentially in accordance with a computerized programming scheme entered into a microprocessor or controller 1. Each material 11, 12 may be sequenced independently by inputting a predetermined starting point in the controller 1 for each drop unit 8 which can select the point at which the material injects under primary pressure and secondary pressure.

The screw positions on the injection units 4, 5 are monitored by a screw position communication device 2, 3 for each of the injection units 4, 5 independently and provide the communication to a microprocessor or controller 1, which communicates the preselected inputs to a communication device or intermediate control unit 6, which in turn provides output communications to at least one mold communication device 7. The mold communication device 7 communicates each of the individual outputs preselected on the controller 1 via the communication device 6 for each drop unit 8 independently for each melted material 11, 12 which is communicated through independent inlets 9, 10 on the mold to produce a first component 14 with two melted or plasticized materials 11, 12 where one is a skin and the other is core material. Clearly, where a first melted material 11 is selected for the skin, a second melted material 12 is selected for the core material, and vice versa.

In one embodiment, a second component 13 may also be produced via the same communication method as mentioned above from either material 11, 12 with each gate/drop being controlled independently in sequence via communication from the mold communication device 7. Also, it is clear that the system may be arranged to provide a plurality of the first described system to control the melt fronts of two different polymer materials sequentially and independently from one another through a hot runner manifold system, e.g., such as the hot runner system at described in U.S. Pat. No. 6,062,840 (which is incorporated herein by reference), so that more than one component may be molded simultaneously.

Typically, opening times, closing times and hold times for each drop unit 8 are entered into a microprocessor or controller 1 of a control system for the mold. The controller 1 is coupled to communication device 6, typically a set of solenoid controls 17 that output control signals to mold communication device 7 that operate the drop units 8. The mold communication device 7 that operates the drop units 8 are typically actuated using hydraulic lines, electronic lines or pneumatic lines 15 to valves or cylinders 18 that open and close the drop units 8. Where two plasticized materials of different composition are utilized, there are generally two drop units for each injection point, one for each plasticized material.

Figure 2:
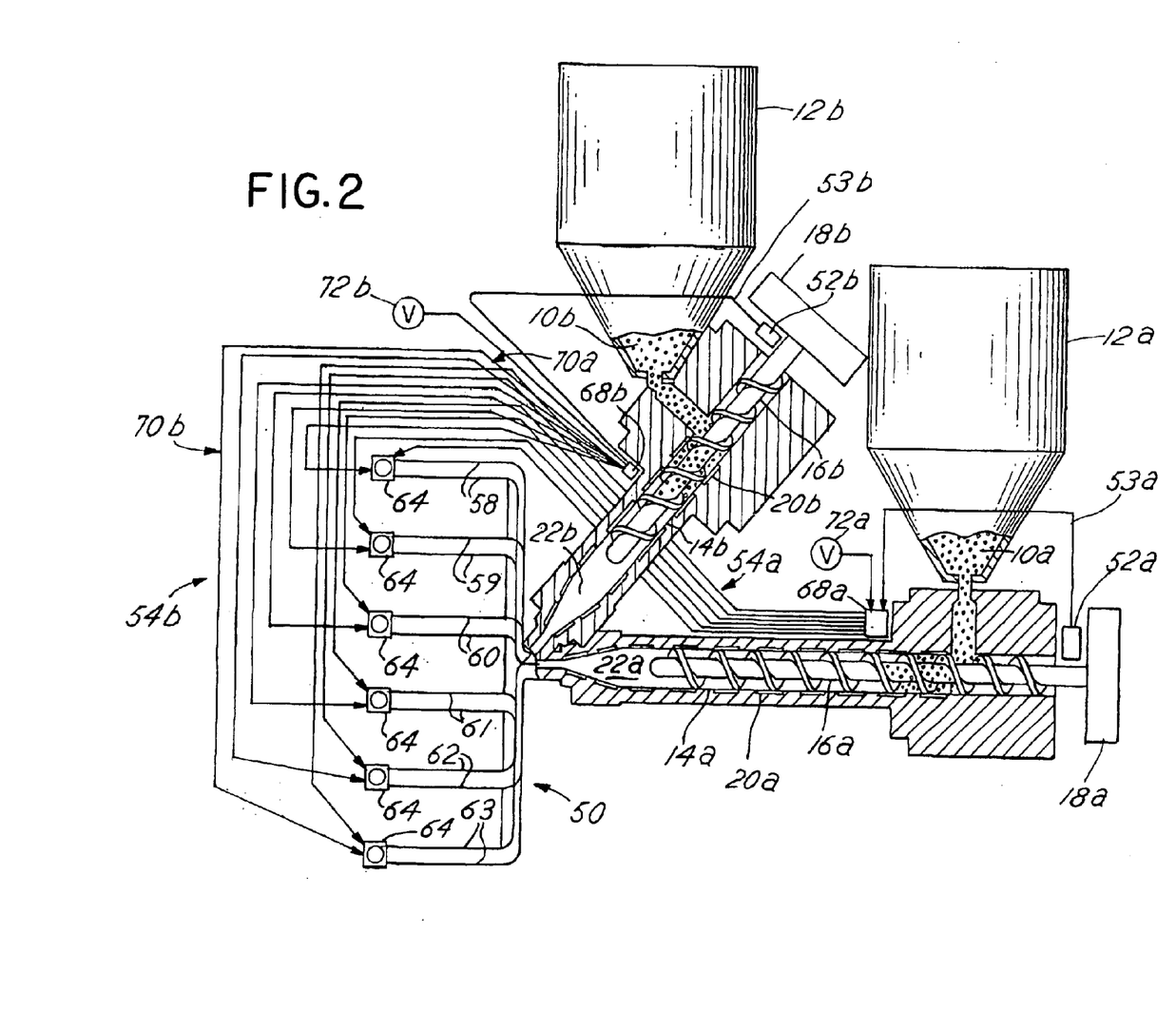
FIG. 2 is an illustration of one embodiment of a multi-cavity sequential valve gating system using at least two reciprocating screws to achieve at least dual injection in accordance with the present invention.

FIG. 2 is an illustration of one embodiment of a multi-cavity sequential valve gating system with at least dual injection. The dual injection may be used to produce different parts using different molds or alternatively, the same parts. An injection molding apparatus with at least two injection units receives plastic pellets 10a, 10b that are fed from a bin or hopper 12a, 12b into a cylindrical channel 14a, 14b, where the pellets 10a, 10b are transported along the length of the channel 14a, 14b using a reciprocating screw

16a, 16b. Typically, a hydraulic motor 18a, 18b rotates the reciprocating screw 16a, 16b on its axis. As the pellets are transported along the channel 14a, 14b, heater bands 20a, 20b melt the pellets 10a, 10b to form a melt pool 22a, 22b.

Pressure is applied to the melt pool 22a, 22b that is located immediately beyond the end of the reciprocating screw 16a, 16b, injecting the melt pool through the mold manifold 50 and into the plurality of mold cavities using a gating system, for example, as described above for FIG. 1. Manifold channels 58–63, preferably in sets of two for a dual injection system, provide for injecting each of two plasticized materials via each drop unit 64. Each drop unit 64 receives control signals from a controller. Though two controllers 68a, 68b are shown, clearly a centralized microprocessor or controller may also be utilized to coordinate injection of melted material by the injection units. The controller or controllers may be programmed to provide through the lines 70a, 70b the desired sequencing, valve pin control and the like at the individual valve gates. Control system 54a, 54b comprises controllers 68a, 68b and lines 70a, 70b. Typically, the controller is programmed to actuate the valve gates in accordance with the cycle time and position of the screw 16a, 16b.

A sensor 52a, 52b on the screw 16a, 16b may be used by the controller to determine the position of the screw 16a, 16b. In this manner the flow fronts of the melt pool 22a, 22b are controlled. The outputs 53a, 53b of the sensors 52a, 52b are provided to the controllers 68a, 68b to monitor the position of the screws 16a, 16b. A voltage source 72a, 72b is provided to operate the controller or controllers. Typically valve pins are utilized, as is known in the art, to sequence injection of melted material from the drop units 64.

Thus, each injection unit can control a select number of valve gates that correspond to a specific cavity. For example, when a first cavity has double the volume of a second cavity, six valve gates, controlled by a first injection unit, may be required to fill the first cavity, and three valve gates, controlled by a second injection unit, may be required fill the second cavity. Pressure can be varied during the process due to different sized parts and geometry, and/or wall stock. If parts are identical, then pressure will vary only slightly during the process.

Figure 4:
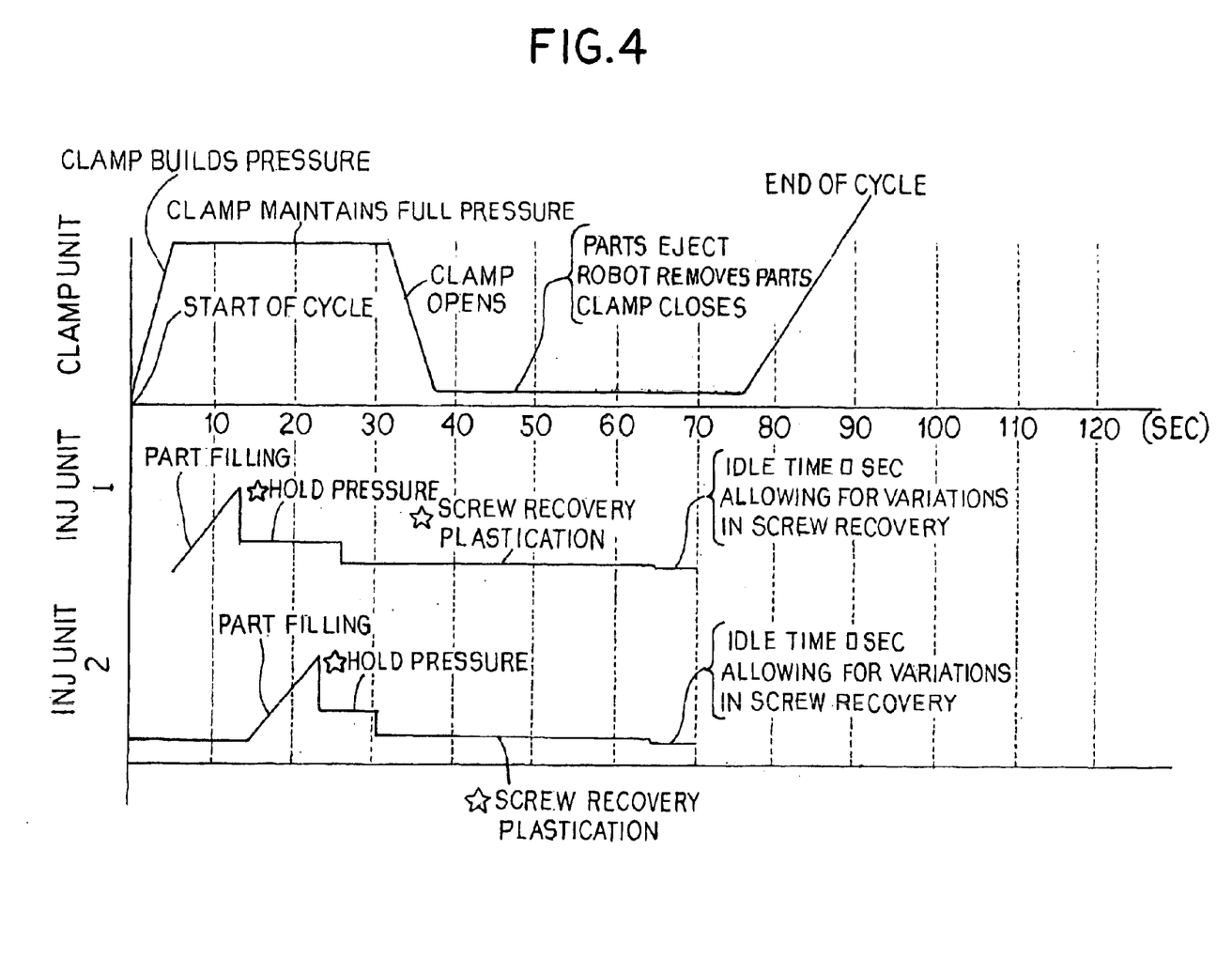
FIG. 4 illustrates a timing schematic for molding according to the embodiment of FIG. 2.

Referring to FIG. 4, the operation of the apparatus of the present invention is schematically illustrated. The press or clamp unit operates on a cyclical basis. The press is initially open and the start of the cycle commences with the press closing building up clamp pressure holding the mold in a closed condition. Full clamp pressure is maintained during the injection process whereafter the press is opened, allowing the robot to remove the molded parts. The press is then closed to re-start the cycle.

The first injection unit fills the larger cavity. In doing so, the injection pressure increases as the part is filled through the sequentially opened and closed valve gates. At this point, all of the valve gates are opened and the injection pressure reduced to a hold pressure. The plasticized material continues to fill the larger cavity to compensate for shrinkage. After a predetermined time, all the valve gates are closed allowing the part therein to "freeze".

While the first injection unit is in the packing out phase, the second injection unit commences filling the smaller cavity. As is apparent, the time available is considerably less than the time for molding the larger part in the larger cavity. The injection pressure of the plasticized material of the second injection unit increases as the smaller part is filled through the sequentially opened and closed valve gates. At this point, all of the valve gates of the smaller cavity are opened and the injection pressure reduced to a hold pressure. The plasticized material continues to fill the smaller cavity to compensate for shrinkage. After a predetermined time, the valve gates are closed allowing the part therein to "freeze".

The multi-cavity sequential valve gating system may utilize co-injection with dual injection. In this embodiment, in at least one mold a first plasticized material is injected, forming an outer skin, and then a second plasticized material is injected, forming a core material that pushes against the outer skin. Other molds coupled to the multi-cavity sequential valve gating system may be filled substantially simultaneously using the sequential valve gating process while at least one mold is being filled using the co-injection sequential valve gating process. Generally, the different plasticized materials are sent down independent runners or channels (as shown in FIG. 2), one for each plasticized material, where the drop units 64 of each pair are activated to achieve the desired co-injection.

Figure 3:
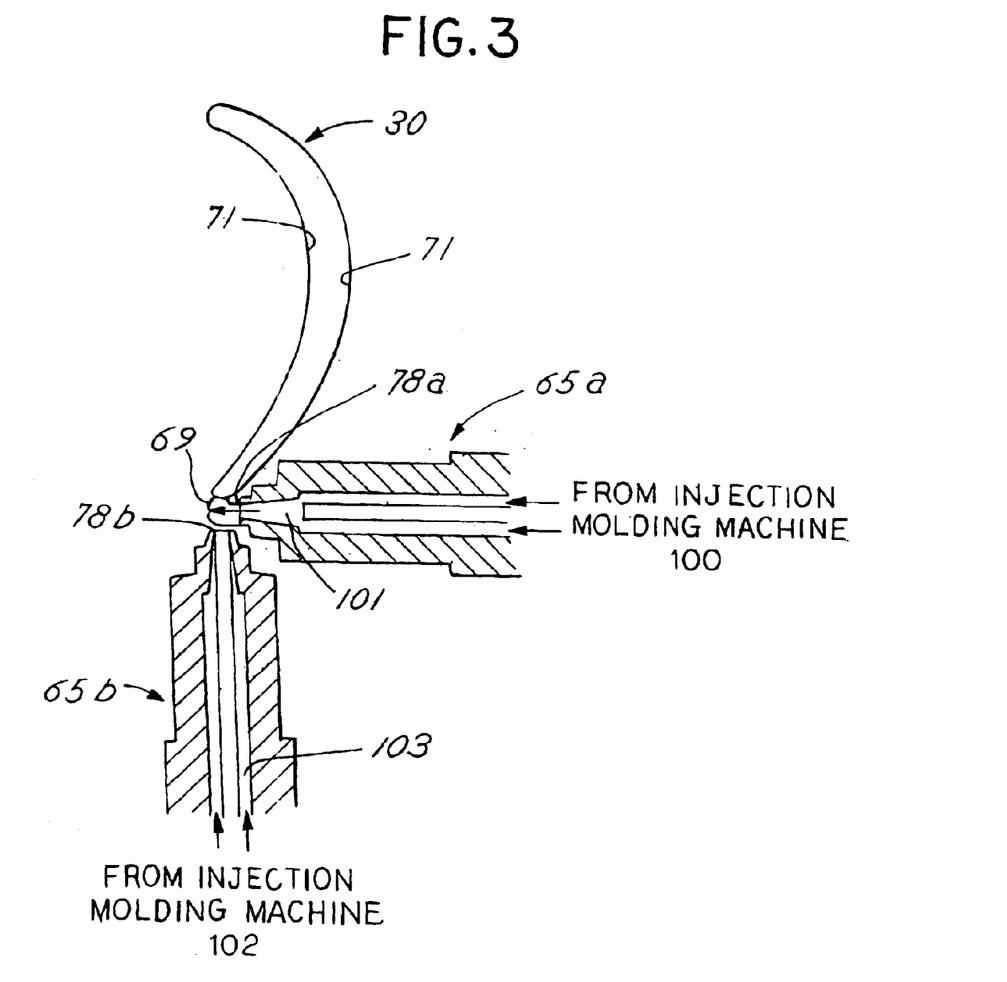
FIG. 3 illustrates an embodiment wherein two independent manifold drops for sequential valve gating for a mold cavity are distributed along the mold cavity in accordance with the present invention.

FIG. 3 illustrates an embodiment comprising drop units or valve gates 65a, 65b for sequential valve gating or servo controlled valve gating for a mold cavity 30. Drop units 65a, 65b can comprise any suitable nozzle construction, including but not limited to those described in U.S. Pat. No. 6,062,840. As described more fully above, the valve gates are sequentially activated in accordance with a predetermined scheme that is programmed into a central controller that controls the injection of the melted materials and the valve gate opening and closing. The process is a form of co-injection, utilizing two separate location points for the skin and core materials, respectively.

For example, a first injection molding machine 100 can inject a first plasticized material 101 that is used as a skin material, and a second injection molding machine 102 can inject a second plasticized material 103 that is used as a core material. The first plasticized material 101 may be of a virgin or new material whereas the second plasticized material 103 may be of a recycled or re-ground material. Alternatively, the second material 103 may be of a different type of polymer, for instance polypropylene, which can be utilized as a reinforcing structure.

In FIG. 3, first plasticized material 101 and second plasticized material 103 can be injected into mold cavity 30 via runner 69. FIG. 3 shows aperture 78a in an open position, and aperture 78b in a closed position, whereupon the first plasticized material 101 is injected into mold cavity 30 via runner 69. A first part of the first plasticized material 101 solidifies within mold cavity 30, and a second part or center of the first plasticized material remains plasticized. Aperture 78b can then be put in an open position, whereupon the second plasticized material 103 is injected into mold cavity 30 via runner 69. The second plasticized material 103 moves both first and second parts of the first plasticized material 101 towards wall 71 of mold cavity 30, whereupon the first plasticized material 101 forms the skin material in mold cavity 30. When the second plasticized material 103 has sufficiently formed the core material in mold cavity 30, aperture 78b can be put into the closed position, and then aperture 78a can be put in the closed position after the mold cavity 30 has been sealed with the first plasticized material 101.

The preferred embodiment has been illustrated utilizing two injection units. It is apparent to those skilled in the art that a single injection unit may be utilized to achieve the benefits of the present invention. The injection pressure to the larger cavity can be throttled to reduce the pressure during packing out, while the same injection unit fills the smaller cavity. The size of the smaller cavity must be significantly smaller than the larger cavity in order to allow sufficient time for screw recovery and plastication of the injection unit without increasing the overall cycle time for the larger part. Alternatively, once the larger cavity has filled and the injection pressure has been reduced to the secondary pressure during packing out, the smaller cavity may be filled and packed out utilizing only the secondary pressure. As a further alternative, the smaller cavity could be filled utilizing the primary pressure at the early stage of filling the larger cavity, closing the valve gate to the smaller cavity until the injection pressure is reduced to the secondary pressure for packing out.

It is now apparent to those skilled in the art that molding efficiencies can be improved over the prior art. First, more than one part may be molded in the time required for a single part. Further, a single mold having multiple cavities is less expensive to manufacture and operate than two separate molds.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. An injection molding method, comprising the steps of:
   providing a hot manifold having a plurality of independently controlled valve gates;
   providing a controller operably connected to each of said valve gates enabling independent opening and closing of each of said valve gates;
   providing a mold having at least two cavities, a larger cavity being larger than a smaller cavity, said larger cavity having at least two inlets each communicating with said valve gates of said hot manifold and said smaller cavity having at least one inlet communicating with respective valve gate of said hot manifold;
   filling said larger cavity with a first plasticized material by sequentially opening and closing said valve gates communicating with said larger cavity;
   packing out said larger cavity,
   simultaneously with said packing out step, filling and packing out said smaller cavity with a second plasticized material by opening and closing said at least one respective valve gate.

2. An injection method as claimed in claim 1 wherein said packing out step comprises opening all of said valve gates communicating with said larger cavity and continuing filling of said first plasticized material into said larger cavity at a reduced pressure to compensate for shrinkage of a part being formed in said larger cavity.

3. An injection method as claimed in claim 2 wherein includes a step of sizing said smaller cavity in order to fill and pack out in less time than to pack out said larger cavity.

4. An injection method as claimed in claim 3 wherein first plasticized material and said second plasticized material are sourced from a single injection unit.

5. An injection method as claimed in claim 3 wherein first plasticized material is sourced from a first injection unit and said second plasticized material is sourced from a second injection unit.

6. An injection method as claimed in claim 5 wherein said hot manifold has a first runner communicating with said first injection unit and a second runner communicating with said second injection unit, said first and second runners each having one of said plurality of valve gates.

7. An injection method as claimed in claim 6 wherein said first plasticized material is the same as said second plasticized material.

8. An injection method as claimed in claim 6 wherein said first plasticized material is different from said second plasticized material.

9. An injection method as claimed in claim 5 wherein said hot manifold has a first runner communicating with said first injection unit and said second injection unit.

10. An injection method as claimed in claim 9 wherein said hot manifold communicates with said first and second injection units at an inlet end of said manifold.

11. A injection method as claimed in claim 9 wherein said hot manifold communicates with said first and second injection units at an outlet end of said manifold.

12. An injection method as claimed in claim 9 wherein said step of filling said larger cavity comprises co-injecting said first plasticized material with said second plasticized material.

13. An injection method as claimed in claim 9 wherein said step of filling said smaller cavity includes co-injecting said second plasticized material with said first plasticized material such that said first plasticized material forms an outer layer of a part molded in said smaller cavity and said second plasticized material forms a core of said part.

14. An apparatus for simultaneously molding at least two components, comprising:
    a hot manifold having a plurality of valve gates;
    a controller operably connected to each of said valve gates enabling independent opening and closing of each of said valve gates;
    a mold having at least two cavities, a larger cavity being larger than a smaller cavity, said larger cavity having at least two inlets each communicating with said valve gates of said hot manifold and said smaller cavity having at least one inlet communicating with a respective valve gate of said hot manifold;
    a first injection unit providing a source of a first plasticized material under pressure to said hot manifold;
    a first monitor coupled to the central control system and positioned to monitor screw position of said injection unit and responsively generate for said controller a signal proportional to said screw position;
    said controller operable to fill said larger cavity by sequentially opening and closing said valve gates communicating with said larger cavity; to pack out said larger cavity by opening said valve gates communicating with said larger cavity; and simultaneously with said packing out step, to fill and pack out said smaller cavity by opening and closing said at least one respective valve gate.

15. The apparatus as claimed in claim 14 wherein said apparatus further comprises a second injection unit providing a source of a second plasticized material under pressure to said manifold.

16. The apparatus as claimed in claim 15 wherein said manifold has a first runner receiving said first plasticized material and communicates with said at least two inlets of said larger cavity and a second runner receiving said second plasticized material and communicates with said at least one inlet of said smaller cavity.

17. The apparatus as claimed in claim 16 wherein said first runner further communicates with said smaller cavity and said second runner further communicates with said larger cavity.

18. The apparatus as claimed in claim 17 wherein said controller selectively open and closes said valve gates to co-inject said first and second plasticized material into said larger and smaller cavities.

19. The apparatus as claimed in claim 18 wherein said first plasticized material forms an outer layer of a part molded and said second plasticized material forms a core of said part.

20. The apparatus as claimed in claim 15 wherein said manifold has a first runner receiving said first plasticized material and said second plasticized material, said first runner communicating with said larger and smaller cavities, providing a path for co-injecting said first and second plasticized materials through said manifold into said larger and smaller cavities.

21. In combination,
  a hot manifold having a plurality of valve gates, said valve gates having operating connections to enable a controller to independently open and close each of said valve gates; and
  a mold having at least two cavities, a larger cavity being larger than a smaller cavity, said larger cavity having at least two inlets each communicating with said valve gates of said hot manifold and said smaller cavity having at least one inlet communicating with a respective valve gate of said hot manifold, said larger cavity being fillable and packed out by sequentially opening and closing said valve gates communicating with said larger cavity, said smaller cavity being sized to be simulaneously filled and packed by opening and closing said at least one respective valve gate in a time less than said larger cavity is being packed out.

22. A combination as claimed in claim 21 wherein each of said valve gates comprises:
  a mechanical drop pin mounted in a valve drop of said manifold and movable between open and closed positions; and
  a drive unit operably connected to said drop pin for effecting said movement thereof.

23. A combination as claimed in claim 22 wherein said mold has two large cavities and two small cavities.

* * * * *